United States Patent
Palaios et al.

(10) Patent No.: US 12,058,007 B2
(45) Date of Patent: Aug. 6, 2024

(54) METHODS FOR DATA MODEL SHARING FOR A RADIO ACCESS NETWORK AND RELATED INFRASTRUCTURE

(71) Applicant: Telefonaktiebolaget LM Ericsson (publ), Stockholm (SE)

(72) Inventors: Alexandros Palaios, Moers (DE); Maksym Girnyk, Solna (SE); Henrik Rydén, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 419 days.

(21) Appl. No.: 17/625,601

(22) PCT Filed: Jul. 26, 2019

(86) PCT No.: PCT/EP2019/070262
§ 371 (c)(1),
(2) Date: Jan. 7, 2022

(87) PCT Pub. No.: WO2021/018370
PCT Pub. Date: Feb. 4, 2021

(65) Prior Publication Data
US 2022/0286365 A1    Sep. 8, 2022

(51) Int. Cl.
*H04L 41/16* (2022.01)
*H04W 24/08* (2009.01)
(Continued)

(52) U.S. Cl.
CPC ............. *H04L 41/16* (2013.01); *H04W 24/08* (2013.01); *H04W 24/10* (2013.01); *H04W 84/04* (2013.01)

(58) Field of Classification Search
CPC ...... H04L 41/16; H04W 24/08; H04W 24/10; H04W 84/04
See application file for complete search history.

(56) References Cited

U.S. PATENT DOCUMENTS

| 8,473,431 B1 | 6/2013 | Mann et al. |
| 10,616,257 B1 * | 4/2020 | Soulhi ................. H04L 63/1425 |

(Continued)

FOREIGN PATENT DOCUMENTS

WO     2016118815 A1     7/2016

OTHER PUBLICATIONS

International Search Report and Written Opinion of the International Searching Authority for PCT International Application No. PCT/EP2019/070262 dated Apr. 7, 2020.
(Continued)

*Primary Examiner* — Kent Krueger
(74) *Attorney, Agent, or Firm* — Sage Patent Group

(57) ABSTRACT

Methods performed by network nodes in a radio access network may be provided. A first network node may receive an identification of data models supported by a second network node. Each of the identified data models may include a data model for calculating a compact representation of data collected, at least one correlation parameter, and an accuracy metric. The first network node may transmit a request that the second network node calculate an identified one of the data models. The first network node may receive the calculated data model from the second network node. The first network node may evaluate the received calculated data model based on determining whether the received calculated data model correlates to at least one correlation parameter.

19 Claims, 11 Drawing Sheets

(51) Int. Cl.
*H04W 24/10* (2009.01)
*H04W 84/04* (2009.01)

(56) References Cited

U.S. PATENT DOCUMENTS

2018/0018590 A1   1/2018  Szeto et al.
2021/0004712 A1*  1/2021  Sarferaz .................. G06F 9/54

OTHER PUBLICATIONS

Chih-Lin I et al., "The Big-Data-Driven Intelligent Wireless Network: Architecture, Use Cases, Solutions, and Future Trends," IEEE vehicular technology magazine, vol. 12, No. 4, Dec. 2017, pp. 20-29.

* cited by examiner

Figure 12

```
Use received calculated data model to generate machine     ╱— 1201
learning model for controlling operations of first network node
```

Figure 13

```
Determine to use received calculated data model when       ╱— 1301
evaluation determines that received calculated data model
correlates to at least one correlation parameter
```

Figure 14

```
Request second data model from identification of data models  ╱— 1401
when evaluation determines that received calculated data
model does not correlate to at least one correlation parameter
```

Figure 15

```
Transmit criteria for receiving updates to received calculated  ╱— 1501
data model
```

METHODS FOR DATA MODEL SHARING FOR A RADIO ACCESS NETWORK AND RELATED INFRASTRUCTURE

CROSS REFERENCE TO RELATED APPLICATION

This application is a 35 U.S.C. § 371 national stage application of PCT International Application No. PCT/EP2019/070262 filed on Jul. 26, 2019, the disclosure and content of which is incorporated by reference herein in its entirety.

TECHNICAL FIELD

The present disclosure relates to data model sharing for a radio access network and related infrastructure.

BACKGROUND

Machine learning (ML) may have the potential to contribute to many existing products and services. A benefit of ML in a radio access network (RAN) has been demonstrated for a number of cases. For example, predicting the quality of a secondary carrier without the need for expensive measurements, session drop prediction, handover prediction, etc. Such use cases may benefit from sharing gathered data on measurements or interactions with users between network nodes. For example, data gathered locally at a site could be transferred to a central node that conducts the learning based on the global information.

SUMMARY

According to some embodiments of inventive concepts, a method performed by a first network node in a radio access network may be provided. The first network node may receive from a radio access network node an identification of data models supported by a second network node for managing radio communications between network nodes. Each of the identified data models may include a data model for calculating a compact representation of data collected from the radio access network, at least one correlation parameter that can be generated that identifies a relationship among data of the compact representation for the identified data model, and an accuracy metric identifying accuracy of the compact representation of the data collected compared to the data collected. The first network node may further transmit a request to the radio access network node that identifies one of the data models with a request that the second network node calculate the identified one of the data models based on the data collected. The first network node may further receive from the radio access network node the calculated data model from the second network node. The first network node may further evaluate the received calculated data model based on determining whether the received calculated data model correlates to the at least one correlation parameter.

According to some other embodiments of inventive concepts, a method performed by a network node in a radio access network may be provided. The network node may transmit to a first network node an identification of data models supported by the network node for managing radio communications between network nodes. Each of the identified data models may include a data model for calculating a compact representation of data collected from the radio access network, at least one correlation parameter that can be generated that identifies a relationship among the data of the compact representation for the identified data model, and a metric identifying accuracy of the compact representation of the data collected compared to the data collected. The network node may receive a request from the first network node that identifies one of the data models with a request that the network node calculate the identified one of the data models. The network node may further calculate the identified one of the data models based on the data collected. The network node may further transmit the calculated data model to the first network node.

According to some embodiments, a computer program may be provided that includes instructions which, when executed on at least one processor, cause the at least one processor to carry out methods performed by a first network node.

According to some embodiments, a computer program product may be provided that includes a non-transitory computer readable medium storing instructions that, when executed on at least one processor, cause the at least one processor to carry out methods performed by a network node.

Other systems, computer program products, and methods according to embodiments will be or become apparent to one with skill in the art upon review of the following drawings and detailed description. It is intended that all such additional systems, computer program products, and methods be included within this description and protected by the accompanying claims.

Operational advantages that may be provided by one or more embodiments may include enabling a more robust, flexible system that enhances data model sharing among network entities while reducing reporting overhead and protecting user and network privacy.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 11-16 are flowcharts of operations that may be performed by network entities in accordance with some embodiments.

DETAILED DESCRIPTION

Figure 1:
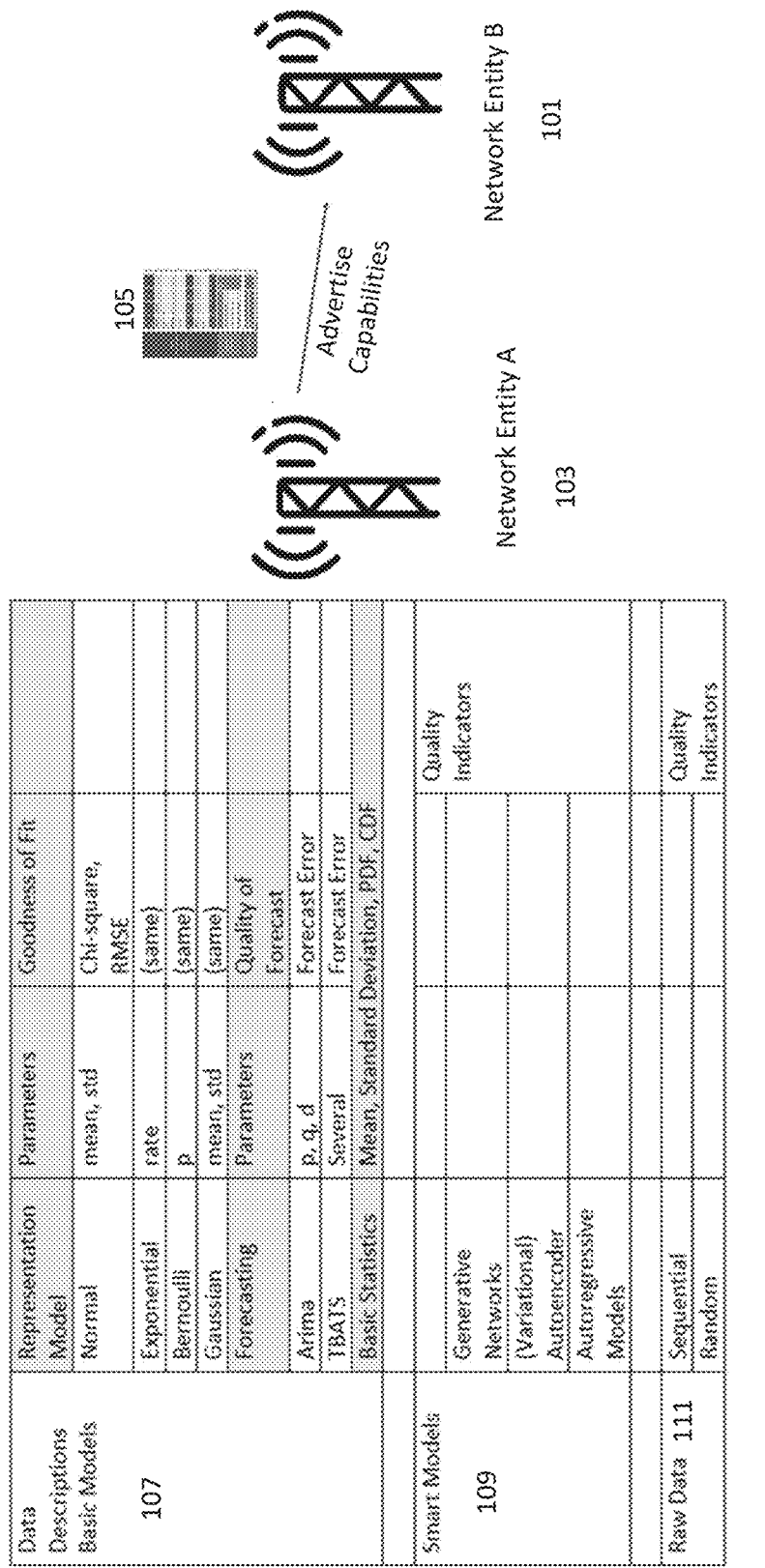
FIG. 1 illustrates an operational view of one network entity sharing a report of data model capabilities supported by the network entity with another network entity in accordance with some embodiments.

Various embodiments will be described more fully hereinafter with reference to the accompanying drawings. Other embodiments may take many different forms and should not be construed as limited to the embodiments set forth herein; rather, these embodiments are provided by way of example to convey the scope of the subject matter to those skilled in the art. Like numbers refer to like elements throughout the detailed description.

Various embodiments include network nodes in or connected to a RAN, e.g., a large scale, distributed, decentralized, cloud/virtualized environment where multiple stakeholders may be operating and where performance is important from day one. This is a highly complex issue where properties such as robustness, scalability, latency and many other metrics may need to be considered.

Some approaches to geographically distributed data are typically centralized. In such an environment, data privacy may be an important issue, and server security may be vital since big datasets with user information may be located on a central server. In one approach, to limit the need for storing (and sending) sensitive data, an approach called federated learning may be used. Federated learning is a technique that may allow users to collectively use advantages of shared models trained from multiples users, without needing to exchange sensitive raw data and store it on a central server.

For a use-case to be suitable for federated learning, there may be some requirements on the dataset such as: Groundtruth exists or can be made available on the network node. For example, this may be for measurements that are expensive or time consuming to gather, or a result of user interaction; many clients/nodes that may perform training of a single model, with the same input features; and/or sensitive data that may be geographically distributed on clients.

Problems that may exist with federated learning and other approaches may include sending data samples between nodes can be a large overhead; too detailed data may not provide sufficient gain in ML prediction performance over less detailed data, but may require more signaling; too coarse data may not provide sufficient gain in ML prediction performance; and/or with federated learning, or when pushing a trained model (e.g. random forest) to a node, agreements may be needed between different network entities on the artificial intelligence (AI)/ML techniques (model, input features) that can be used inside the network. There may be times that such mutual agreements might not be feasible for an AI/ML technique to be applied.

Certain aspects of the present disclosure and their embodiments may provide solutions to these and/or other challenges. Various embodiments of the present disclosure may provide a radio access network node (also referred to as a network node) that may request a data model from a second network node based on correlation characteristics and may thereby tradeoff between accuracy and reporting overhead. Some embodiments may further provide for use of data models and may remove the need to transmit substantially large volume of raw data between different network nodes or parts. Various embodiments may further provide for flexibility on different network vendors and parts of a 5G radio access network system, on which AI/ML techniques may be enabled. Some embodiments may further provide for protection of user and network privacy because shared data models mask the real measurements.

Various embodiments of the present disclosure are directed to a method for signaling of data between network entities as illustrated in FIG. 1. In various embodiments, network entities (also referred to as nodes, network nodes, radio network node, and/or network entities) each may be, but are not limited to, a radio access node, a core node, a base station, or a user equipment (UE). Although various embodiments are described with reference to a first node and a second node, a first node may receive/transmit information either directly or indirectly from to a second node via a third (or more) node; and a second node may receive/transmit information either directly or indirectly from a first node via a third (or more) node.

Referring to FIG. 1, and as described in more detail below, a first radio network node 101 (also referred to as a first node, first network node, or network entity B) may plan to build a ML model with data 105 that is available at a second radio network node (103 also referred to as a second node, second network node, or network entity A). First network node 101 may receive advertised data model capabilities from second network node 103 in the format of a report 105. The capabilities included in report 105 may include a list of data models supported by second node 103 such as, but not limited to normal, exponential, Bernoulli, Gaussian, Arima, TBATS, basic statistics, generative networks, autoencoder, autoregressive, etc.; and/or raw data and/or a subset of raw data that includes data from the raw data.

Capabilities supported by second node 103 may be based on data modeling methods that are available at second node 103 and may include potential privacy issues related to the data. First network node 101 may request a data model from second network node 103 from report 105 received from second network node 103. Second network node 103 may build and signal the requested data model having a format included in report 105 that was sent to first network node 101.

Still referring to FIG. 1, report 105 may be, but is not limited to, a table of data modelling capabilities of second network entity 103. Report 105 may include the identity of one or more data models for a compact representation of collected data supported by second network node 103 including, but not limited to, data descriptions of basic data models 107, smart models 109, and/or raw data 111. Data descriptions of basic data models 107 may include an identity of supported data representation model(s) (e.g., normal, exponential, Bernoulli, Gaussian, Arima, TBATS, basic statistics, etc.). Report 105 may further include an identity of one or more advanced or smart data models 107 based on smart techniques such as AI/ML (e.g, generative networks, autoencoder, autoregressive, etc.). Report 105 also may further include an identity of raw data 111 supported by second network node 103, such as raw data subset(s) (e.g., Sequential, Random, etc.) or all raw data if there are no restrictions on data sharing (e.g., no privacy restrictions). Report 105 also may include a correlation parameter(s) that can be reported for each identified data model (e.g., mean, std, rate, p, q, d, or any other identified correlation parameter for data in the identified data models); and an accuracy metric identifying accuracy of each of the compact representations of the data collected compared to the data collected. The accuracy metric may describe the goodness of a fit/quality indicator of the compact representation of the data to the collected data.

As illustrated in report 105, various embodiments may allow sharing not only of data models but sharing models that may perform forecasts and predictions. Moreover, if, for example, a high correlation from a received correlation parameter exists, there are no privacy constraints, and overhead is low, requesting raw data (or a subset of raw data) may be possible.

Still referring to FIG. 1, first network node 101 may evaluate the data model built and received from second network node 103 to determine whether the received data correlates with a target predicted variable (also referred to as a correlation parameter). First network node 101 may evaluate the received data model from the second network node 103 by estimating its correlation with a target variable/correlation parameter (i.e., what should be predicted by the data model). Based on results of the correlation, first network node 101 may optionally request a new data model for report 105 and may evaluate a new correlation of the new data model. First network node 101 also may optionally signal to the second network node 103 a reporting triggering describing when to trigger a new data model report to the first network node 101.

Figure 2:
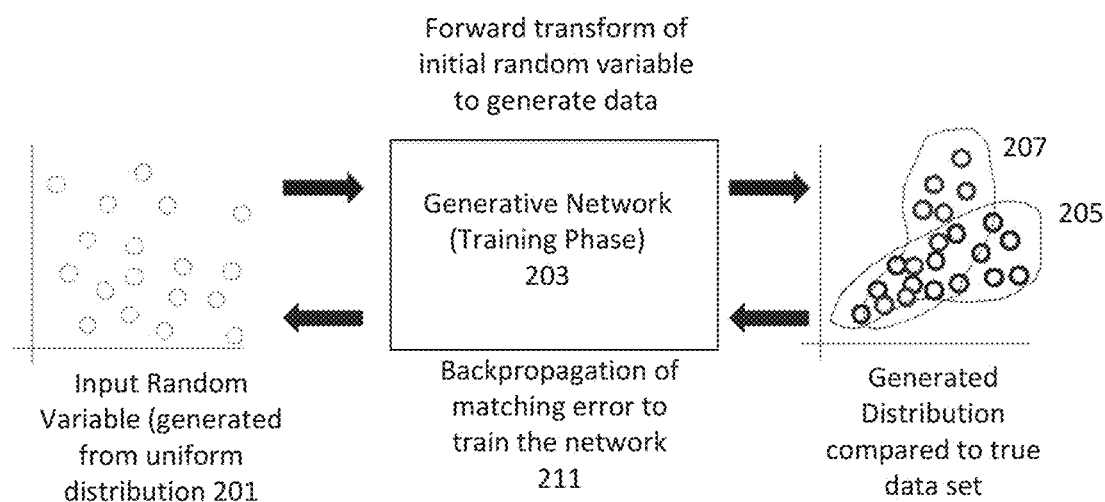
FIG. 2 illustrates a generative network training phase approach for a learning a data distribution.

Data models will now be described in more detail. A network (e.g., a generative network) may collect real data and calculate a compact representation of the data. Techniques for building the compact representation of data may include any technique for calculating a compact representation of data including, but not limited to, generative networks, autoencoder, autoregressive models, etc. In an example illustrated in FIG. 2, a generative network may be used to learn a data distribution. FIG. 2 illustrates a learning phase where a network has partially learned a data distribution. After further training iterations, a convergence between the learned and real data may be achieved. Still referring to FIG. 2, random variables generated from a uniform distribution of data may be input 201 to generative network (training phase) 203 to forward transform the input initial random variables to generate data. Generative network 203 may output a generated distribution 205. Generated distribution 205 is shown compared to true data set 207. Generative network 203 backpropagates 211 a matching error of the comparison between generated distribution 205 and true data set 207.

Figure 3:
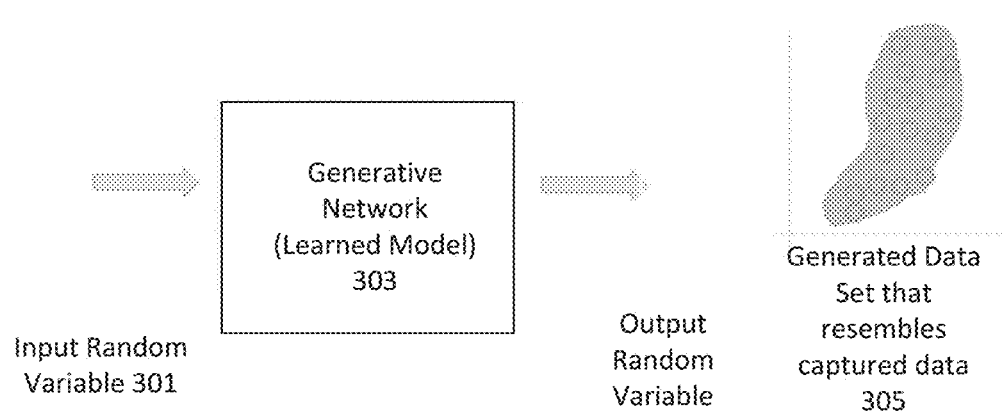
FIG. 3 illustrates a generative network learned model approach to generate data.

Once a compact representation is learned, the compact representation of data may be shared to a different network entity to recreate the data sets as illustrated in FIG. 3. FIG. 3 illustrates using generative network (learned model) 303 to generate 305 a compact representation of data that resembles the distribution of the captured/collected data set. By providing input from a uniform distribution 301 to generative network (learned model) 303 the output 305 that is generated has a similar structure to the real measurements.

Figure 4:
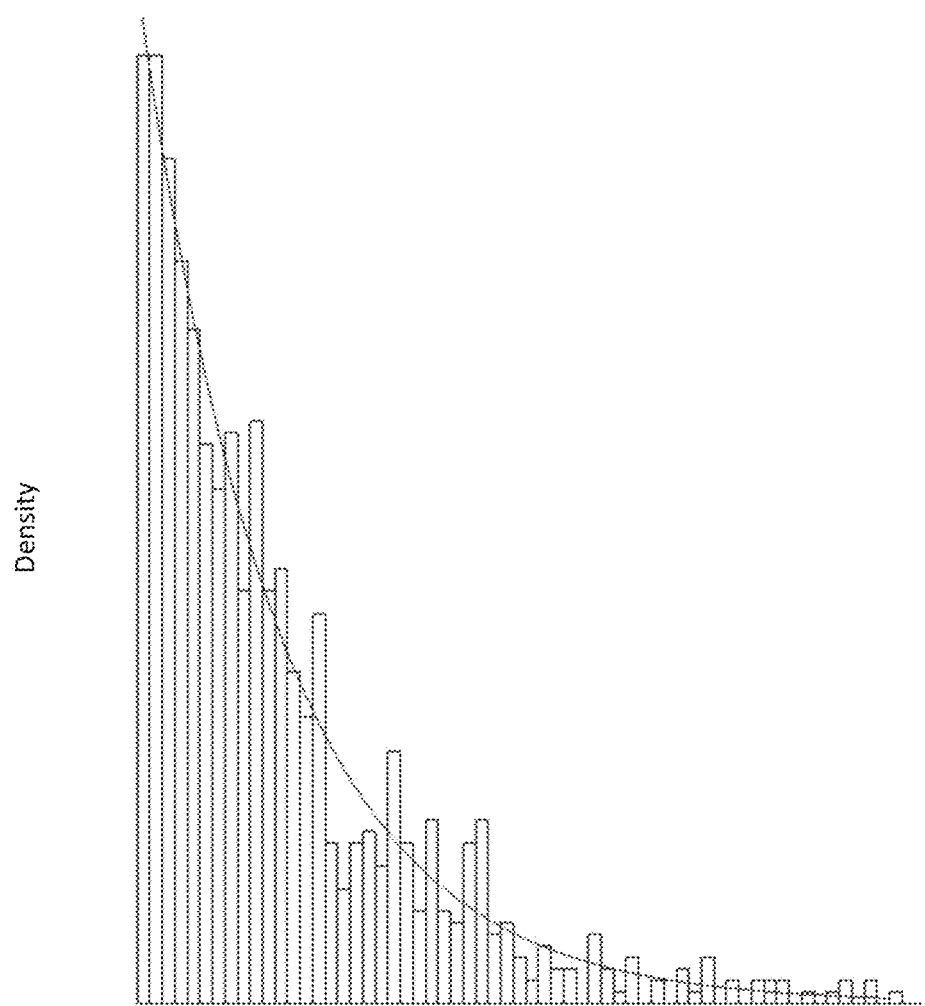
FIG. 4 illustrates collected data and a fitted distribution approach for a compact representation of the collected data.
Figure 5:
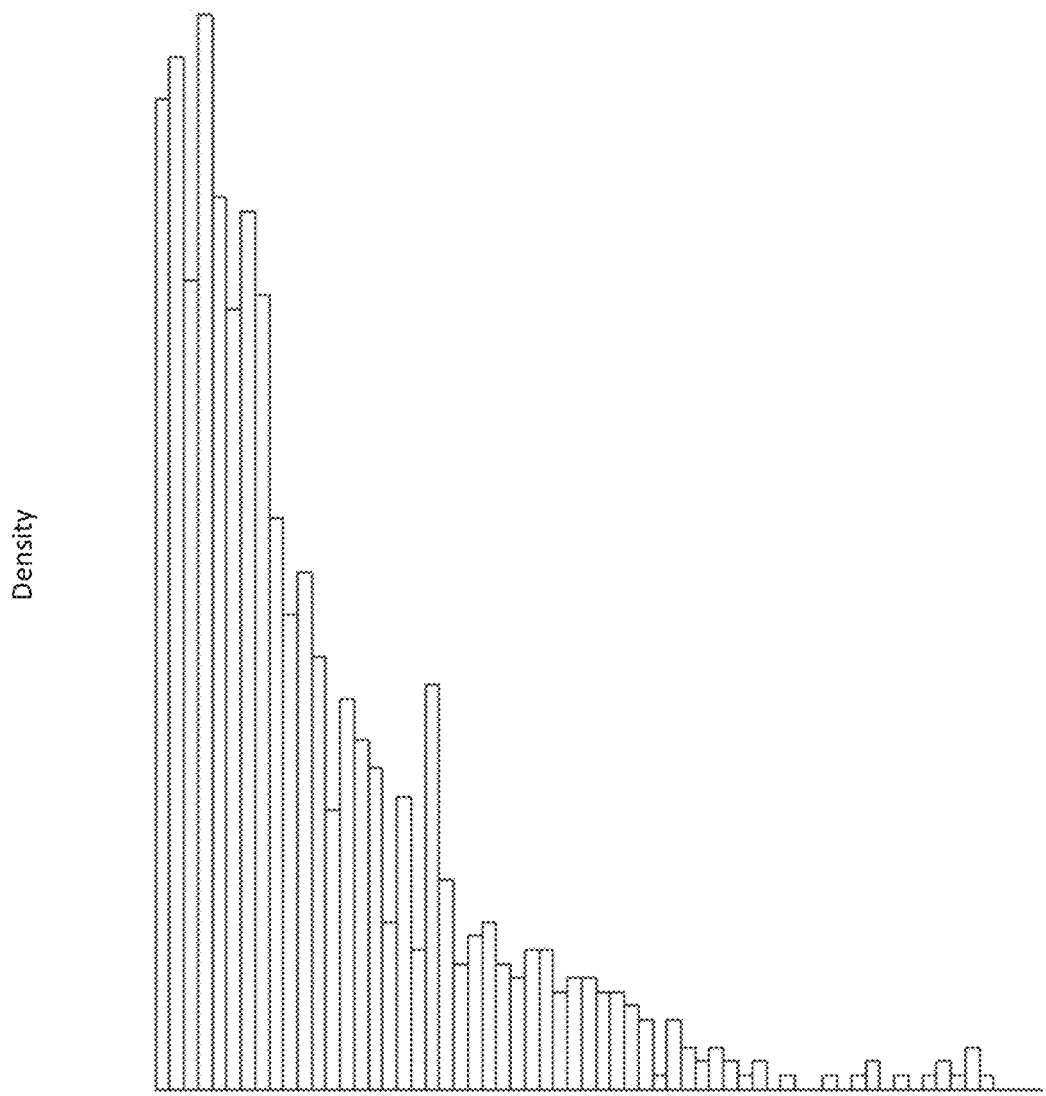
FIG. 5 illustrates a generated data set resembling a collected data set.

As described above, other techniques may be used for building compact data representations, such as fitted distributions or basic statistics when the tracked phenomena allow for such representations. Another example for generating a compact representation of data is illustrated in FIG. 4. FIG. 4 illustrates collected data measurements with the bars and a fitted distribution with a solid line showing a compact representation of the collected data. As illustrated in FIG. 4, as a data set is being collected an exponential distribution may give the best fit compared to other distributions. In FIG. 4, since fitting results are good without increased complexity, this exponential model may be selected to represent the collected data. The compact data representation is shown as the solid line that captures the decaying nature of the data. The solid line can be described with a lambda parameter that is a description that can be used to recreate similar looking data sets (but which may not be identical to the collected data), as shown in FIG. 5.

The solid line describing the collected data set in FIG. 4 may be shared with a second network entity. The second network entity may generate a data set from the received solid line as illustrated in FIG. 5. The generated data set resembles the same collected data distribution shown in FIG. 4, although the generated data set of FIG. 5 and the collected data set of FIG. 4 may not be exactly the same.

Figure 6:
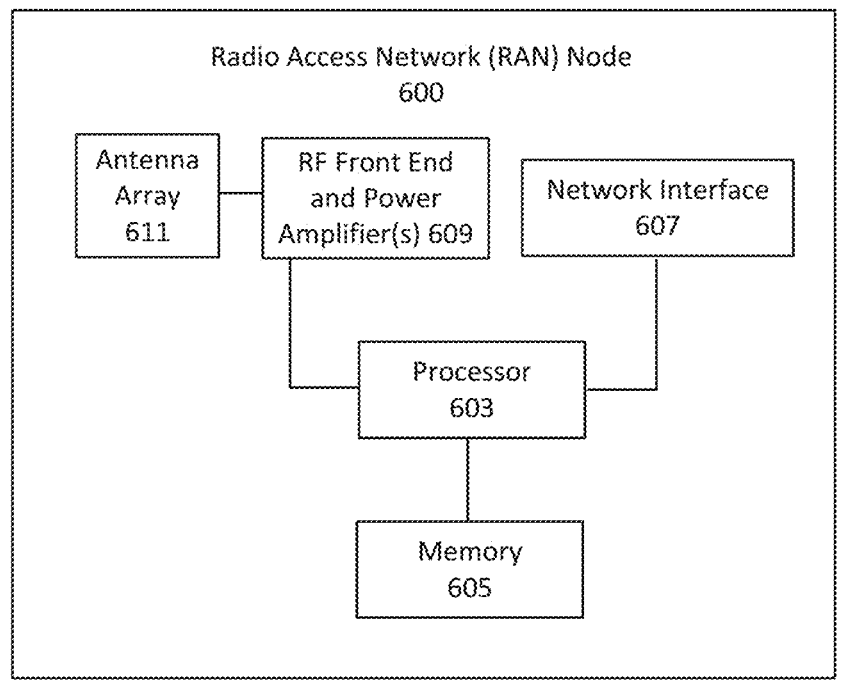
FIG. 6 is a block diagram of operational modules of a radio access network node in accordance with some embodiments.

FIG. 6 is a block diagram illustrating a radio access network (RAN) node 600 (e.g., a base station, eNB, gNB, etc.) of a telecommunications network. The RAN node 600 includes at least one processor circuit 603 (also referred to as a processor), at least one memory circuit 605 (also referred to as memory), and a network interface 607 (e.g., wired network interface and/or wireless network interface) configured to communicate with other network nodes. The RAN node 600 may be configured as a radio network node containing a RF front end with one or more power amplifiers 609 that transmit and receive through antennas of an antenna array 611. The at least one memory 605 stores computer readable program code that when executed by the at least one processor 603 causes the processor 603 to perform operations according to embodiments disclosed herein.

Figure 7:
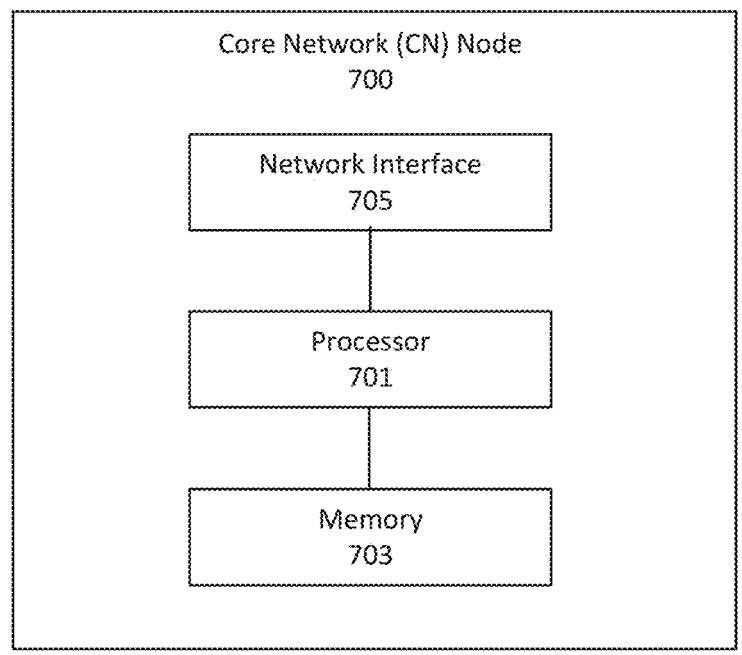
FIG. 7 is a block diagram of elements of a core network node that are configured in accordance with some embodiments.

FIG. 7 is a block diagram illustrating elements of a core network CN node (e.g., an SMF node, an AMF node, etc.) of a communication network configured to provide communication according to embodiments of inventive concepts. As shown, the CN node 700 may include network interface circuitry 705 (also referred to as a network interface) configured to provide communications with other nodes of the core network and/or the radio access network RAN. The CN node 700 may also include at least one processing circuitry 701 (also referred to as a processor) coupled to the network interface circuitry, and at least one memory circuitry 703 (also referred to as memory) coupled to the processing circuitry. The at least one memory circuitry 703 may include computer readable program code that when executed by the processing circuitry 701 causes the processing circuitry to perform operations according to embodiments disclosed herein. According to other embodiments, processing circuitry 701 may be defined to include memory so that a separate memory circuitry is not required.

As discussed herein, operations of the CN node 700 may be performed by processing circuitry 701 and/or network interface circuitry 705. For example, processing circuitry 701 may control network interface circuitry 705 to transmit communications through network interface circuitry 705 to one or more other network nodes and/or to receive communications through network interface circuitry from one or more other network nodes. Moreover, modules may be stored in memory 703, and these modules may provide instructions so that when instructions of a module are executed by processing circuitry 701, processing circuitry 701 performs respective operations (e.g., operations discussed below with respect to example embodiments).

Figure 8:
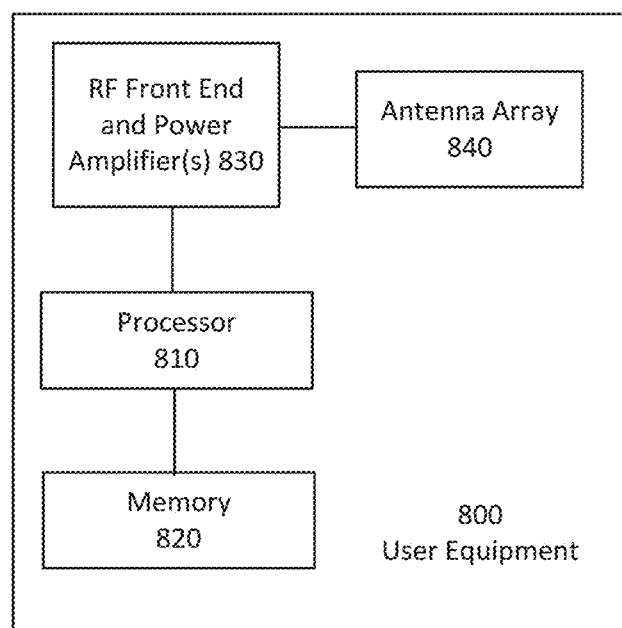
FIG. 8 is a block diagram of elements of a user equipment that are configured in accordance with some embodiments.

FIG. 8 is a block diagram illustrating a user equipment (UE) 800 that is configured according to some embodiments. The UE 800 can include, without limitation, a wireless terminal, a wireless communication device, a wireless communication terminal, a terminal node/UE/device, etc. The UE 800 includes a RF front-end 830 comprising one or more power amplifiers the transmit and receive through antennas of an antenna array 840 to provide uplink and downlink radio communications with a radio network node (e.g., a base station, eNB, gNB, etc.) of a telecommunications network. UE 800 further includes a processor circuit 810 (also referred to as a processor) coupled to the RF front end 830 and a memory circuit 820 (also referred to as memory). The memory 820 stores computer readable program code that when executed by the processor 810 causes the processor 810 to perform operations according to embodiments disclosed herein.

Sharing data models between different network entities will now be described in more detail. Signaling of shared data models between different network entities may include sharing of a compact representation of data or raw data, which may enable data privacy protection.

Figure 9:
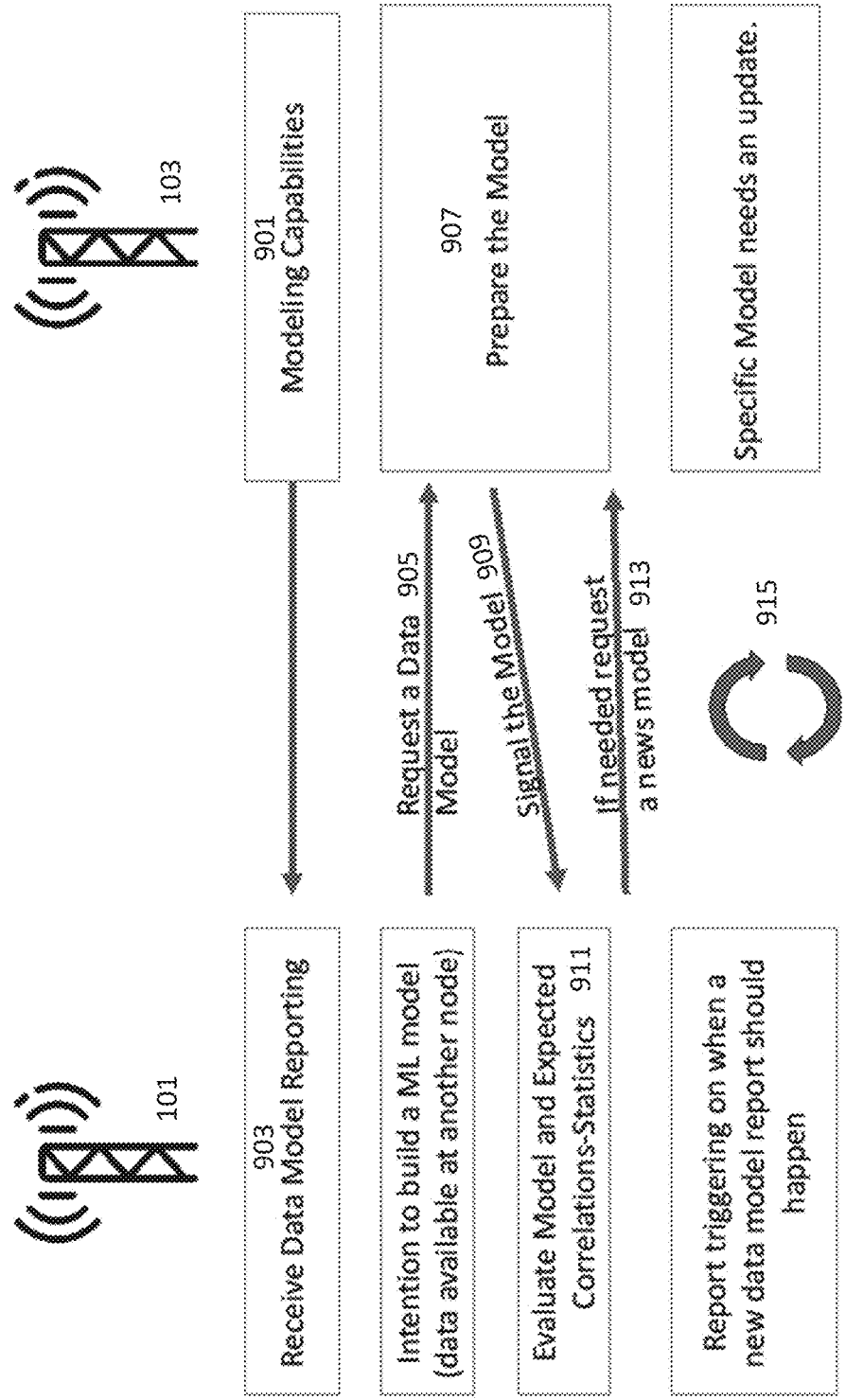
FIG. 9 illustrates operations to share and use a data model in accordance with some embodiments.

FIG. 9 illustrates a sequence of operations that may be performed for signaling and sharing of data models between different network entities. Referring to FIG. 9, a first node 103 may build a report 105 of data modelling capabilities for collected data of first node 103. First node 103 may forward 901 report 105 to another network entity 101.

The forwarding of capabilities 901 can be done directly by first node 103 itself, or by using a core node 700 of a radio access network or UE 800. If core node 700 is used, core node 700 can inform the relevant network entities of the modeling capabilities of first node 103.

Still referring to FIG. 9, second node 101 may receive 903 the data model capabilities report 105 of other network nodes (e.g., from first node 103). Information in report 105 may be updated automatically based on new capabilities of reporting network nodes (e.g., a new capability was enabled, a new model is available due to more data collected, hardware was upgraded, a (new) network entity appeared/disappeared from the network, etc.).

First node 103 may receive 905 a request (e.g., from a 5G core node 700, from network node 600, or a UE 800) to build a model from report 105 for improving performance or enabling new features. Responsive to receiving the request, first node 103 may prepare 907 and signal 909 the model request to a network node where data is collected. Alternatively, responsive to receiving the request, if the collected data is at first node 103, first node 103 may prepare the requested data model. The network entity that receives the request calculates the requested data model. Since these processes may be resource demanding, fitted models that have a smaller footprint can also be cached and only updated when some validity period that is model specific expires. The calculated model may be shared with the network entity that requested data model.

The network entity that receives the calculated model may evaluate 911 the calculated model. Deploying a model may include creating a data set(s), evaluating correlations and testing trends in the data set, applying specific modelling techniques and/or feasibility analysis. A feasibility analysis may test the network entity may have by using the data set with a specific modelling technique. If the gains are not great enough, the network entity can request a new model, as described further below.

Optionally, the network entity that receives the calculated data model may request 913 a new data model if the previously received calculated data model did not yield expected results. Part of this request of a new data model message can also include some characteristics that the new data model should have. For example, the characteristic may be a specified root mean square error (RMSE) of the new model between the collected data and the modelled data.

Optionally, updates 915 may be sent or received for the shared model. Each network entity (receiver and sender of the data model) may signal updates of the current data model(s). The receiving network entity can signal to the transmitting network entity how often updates are needed, which may be based on a validity period or by providing a specific target (e.g., when RMSE of the current data model does not change by a specified amount). The transmitting network entity of the data model can also initiate the process of updating the data model when the transmitting network entity finds that the submitted data model(s) is no longer good or valid.

Example embodiments will now be discussed. In a first example illustrated in FIG. 10, two base stations 101 and 103 may cover a large part of a highway where a part of their served traffic is being generated. A new car/UE 800 that enters area the highway served by base station 103 likely may be served in the future from base station 101.

Figure 10:
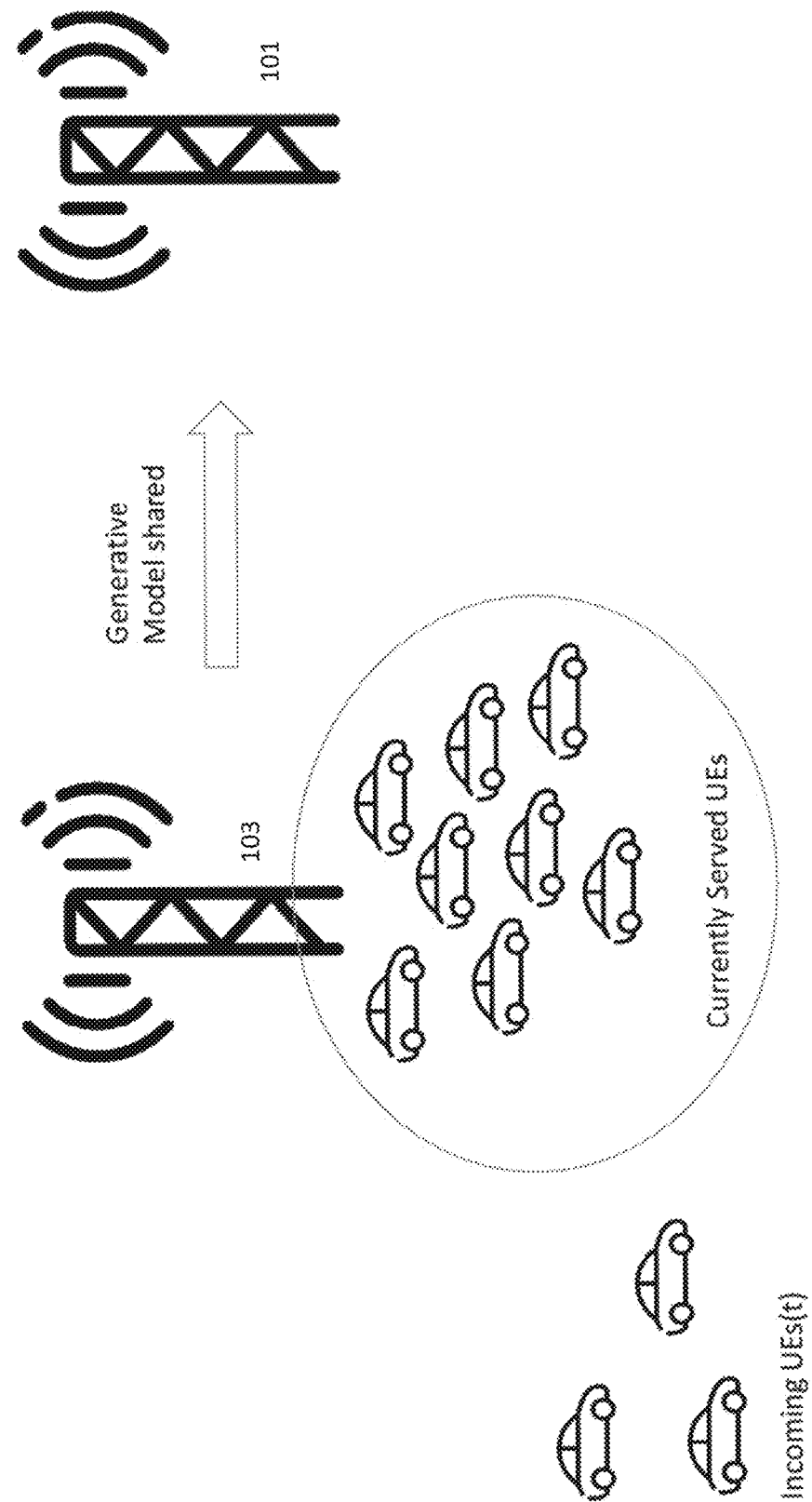
FIG. 10 illustrates an exemplary embodiment of sharing and using a data model in accordance with some embodiments.

Still referring to FIG. 10, base station 101 may request a data model from report 105 received at base station 101 of data models supported by base station 103. The requested data model may be a generative model that include as a correlation parameter a correlation of incoming cars to outgoing cars on the area of the highway served by base station 103. The correlation parameter may be expressed as an incoming rate of new cars/UEs 800 at base station 103. Base station 101 may receive and evaluate the requested data model. The evaluation may be performed with simple models (or, e.g., looking at correlations), and validates whether the input may be useful to base station 101 in predicting the output (or, e.g., that input correlates with the desired output). Base station 101 may determine that the incoming rate of new cars/UEs 800 at base station 103 is a useful feature.

Base station 101 may request a more analytical or new data model from report 105 of data models received from base station 103. Base station 101 may receive and evaluate the second requested data model. Base station 101 may determine that the second received data model has not significantly improved on the performance of the first data model received.

Base station 101 may signal to base station 103 that an update to the first received data model should be transmitted to base station 101 when the captured correlation parameter drops by 10%.

In a second exemplary embodiment, a UE 800 running an optimization algorithm is entering a new country and may receive information in a compact form of spatial radio coverage from base stations where expected reference signal received power (RSRP) is being model as a function of location. UE 800 can seek to optimize its behavior because UE 800 may adapt in advance for areas where the chance of losing signal quality can be mitigated, for example initiating a handover in advance. Different UEs 800 can run different optimization algorithms (including, but not limited to, AI/ML techniques) for this type of problem based on received information that resembles coverage maps of different base stations. The optimization algorithm may find a base station sequence in space and time to reduce the chance of losing signal reception and avoid reducing handovers that may increase overhead in the network.

For example, a UE 800 may enter a new country and may receive a report 105 on modeling capabilities of base stations, including a data model that includes a correlation parameter on trends of RSRP measurements as a function of location.

UE 800 may plan to execute an algorithm that exploits the correlation parameter on trends of RSRP measurements as a function of location included in the data model supported by the base station. UE 800 may request a data model that includes the correlation parameter on trends of RSRP measurements as a function of location from several base stations.

UE 800 may receive and evaluate the requested data model. The evaluation may include determining that that the spatial information of the RSRP from different base stations is important for predicting RSRP values as well as reducing the number of handovers.

UE 800 may use the data model and signal the base station to send an update to UE 800 with a new data model once there is an updated version of the data model.

Although the present disclosure includes descriptions within the context of 3GPP New Radio (NR) technology, the invention is not so limited. The present disclosure is applicable to other wireless access networks and network entities implementing other access technologies and standards including, but not limited to, 3GPP Long Term Evolution (LTE), or 3GPP LTE and NR integration (also referred to as non-standalone NR).

Operations of the first network node 101 (implemented using the structure of the block diagram of FIG. 6) will now be discussed with reference to the flow charts of FIGS. 11-15 according to some embodiments of inventive concepts. For example, modules may be stored in memory 605 of FIG. 6, and these modules may provide instructions so that when the instructions of a module are executed by respective node 600 processing circuitry 603, processing circuitry 603 performs respective operations of the flow chart.

Figure 11:
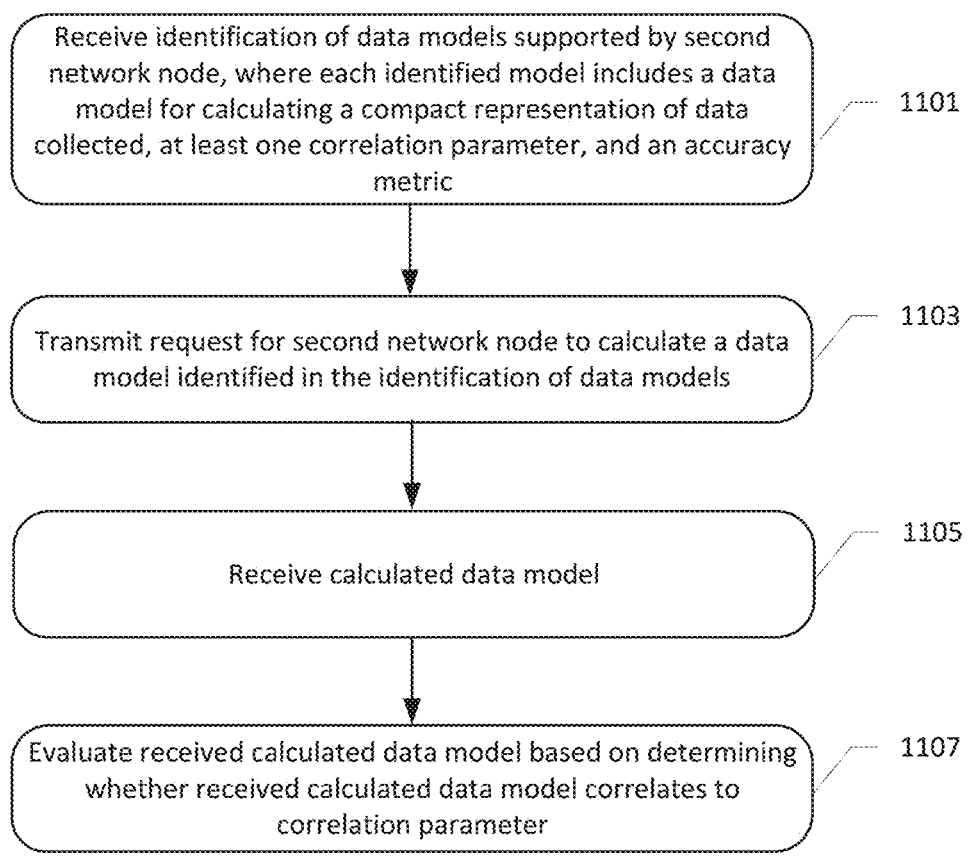

Referring first to FIG. 11, first network node 101 receives 1101 a radio access network node an identification of data models 105 supported by second network node 103 for managing radio communications between network nodes. The radio access network node may be second network node 103, another radio access network node using the structure of either block diagram 6, a core network node using the structure of the block diagram of FIG. 7, or a user equipment 800 using the structure of the block diagram of FIG. 8. The identified data models 105 include a data model for calculating a compact representation of data collected from the radio access network, at least one correlation parameter that can be generated that identifies a relationship among data of the compact representation for the identified data model, and an accuracy metric identifying accuracy of the compact representation of the data collected compared to the data collected.

First network node 101 transmits 1103 a request the radio access network node that identifies one of the data models with a request that second network node 103 calculate the identified one of the data models based on the data collected.

First network node 101 receives 1105 from the radio access network node the calculated data model from second network node 103.

First network node 101 evaluates 1107 the received calculated data model based on determining whether the received calculated data model correlates to the at least one correlation parameter.

The identification of data models 105 may further include an identity of a subset of the data collected from the radio access network and a quality metric for the subset of the data.

Referring to FIG. 12, first network node 101 may use 1201 the received calculated data model to generate a machine learning model for controlling operations of first network node 101.

The identification of data models 105 supported by second network node 103 may be automatically updated in first network node 101 triggered by receipt of messages based on new capabilities of second network node 103.

Referring to FIG. 13, first network node 101 may determine 1301 to use the received calculated data model when the evaluation determines that the received calculated data model correlates to the at least one correlation parameter.

Referring to FIG. 14, first network node 101 may request 1401 a second data model from the identification of data models 105 when the evaluation determines that the received calculated data model does not correlate to the at least one correlation parameter.

Referring to FIG. 15, first network node 101 may transmit 1501 to the radio access network node a criteria for receiving updates to the received calculated data model. The criteria may include at least one of a time period and a defined performance target.

Various operations from the flow charts of FIGS. 11-15 may be optional with respect to some embodiments of first network node 101 and related methods. For example, operations of blocks 1201, 1301, 1401, and 1501 of FIGS. 12-15, respectively, may be optional.

Operations of network node 103 (implemented using the structure of the block diagram of FIG. 6) will now be discussed with reference to the flow chart of FIG. 16 according to some embodiments of inventive concepts. For example, modules may be stored in memory 605 of FIG. 6, and these modules may provide instructions so that when the instructions of a module are executed by respective node 600 processing circuitry 603, processing circuitry 603 performs respective operations of the flow chart.

Network node 103 transmits 1601 to first network node 101 an identification of data models 105 supported by network node 103 for managing radio communications between network nodes. First network node 101 may be a radio access network node using the structure of the block diagram of FIG. 6, a core network node using the structure of the block diagram of FIG. 7, or a user equipment using the structure of the block diagram of FIG. 8. Each of the identified data models includes a data model for calculating a compact representation of data collected from the radio access network, at least one correlation parameter that can be generated that identifies a relationship among the data of the compact representation for the identified data model, and a metric identifying accuracy of the compact representation of the data collected compared to the data collected.

Network node 103 receives 1603 a request from first network node 101 that identifies one of the data models with a request that network node 103 calculate the identified one of the data models. Receiving 1603 the request from first network node 101 may be received from first network node 101 on behalf of a second network node (e.g., having the structure of the block diagram of FIG. 6).

Network node 103 calculates 1605 the identified one of the data models based on the data collected.

Network node 103 transmits 1607 the calculated data model to first network node 101. Transmitting 1607 the calculated data model to first network node 101 may be transmitted to first network node 101 for transmission to a second network node (e.g., having the structure of the block diagram of FIG. 6).

The second network node may be a radio access network node using the structure of the block diagram of FIG. 6, a core network node using the structure of the block diagram of FIG. 7, or a user equipment using the structure of the block diagram of FIG. 8.

Figure 16:
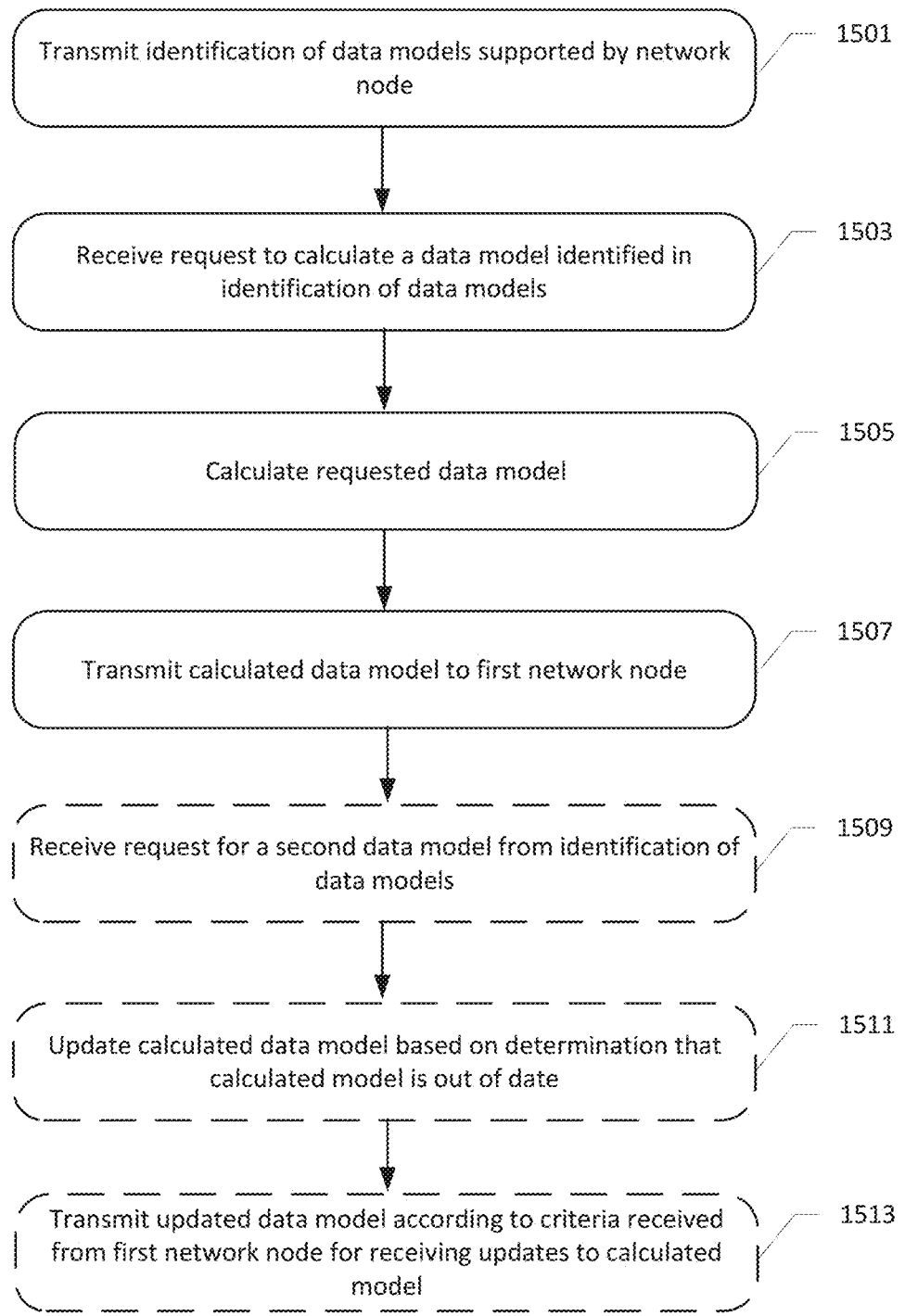

Still referring to FIG. 16, the identification of data models 105 may further include an identity of a subset of the data collected from the radio access network and a quality metric for the subset of the data.

The identification of data models 105 supported by network node 103 may be automatically updated to first network node 101 triggered by receipt of messages based on new capabilities of network node 103.

Still referring to FIG. 16, network node 103 may receive 1609 a request from first network node 101 requesting a second data model from identification of data models 105.

Network node 103 may update 1611 the calculated data model based on determining that the calculated data model is out of date.

Network node 103 may transmit 1613 the updated data model to first network node 101 according to criteria received from first network node 101 for receiving updates to the calculated data model. The criteria may include at least one of a time period and a defined performance target.

Various operations from the flow charts of FIG. 16 may be optional with respect to some embodiments of network node 103 and related methods. For example, operations of each of blocks 1609, 1611, and 1613 of FIG. 16 may be optional.

Aspects of the present disclosure have been described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method performed by a first network node in a radio access network, the method comprising:

receiving from a radio access network node an identification of data models supported by a second network node for managing radio communications between network nodes, wherein each of the identified data models comprises a data model for calculating a compact representation of data collected from the radio access network, at least one correlation parameter that can be generated that identifies a relationship among data of the compact representation for the identified data model, and an accuracy metric identifying accuracy of the compact representation of the data collected compared to the data collected;

transmitting a request to the radio access network node that identifies one of the data models with a request that the second network node calculate the identified one of the data models based on the data collected;

receiving from the radio access network node the calculated data model from the second network node;

evaluating the received calculated data model based on determining whether the received calculated data model correlates to the at least one correlation parameter.

2. The method of claim 1, further comprising:
using the received calculated data model to generate a machine learning model for controlling operations of the first network node.

3. The method of claim 1, wherein the radio access network node is the second network node, another radio access network node, a core network node, or a user equipment.

4. The method of claim 1, wherein the identification of data models further comprises an identity of a subset of the data collected from the radio access network and a quality metric for the subset of the data.

5. The method of claim 1, wherein the identification of data models supported by the second network node is automatically updated in the first network node triggered by receipt of messages based on new capabilities of the second network node.

6. The method of claim 1, further comprising:
determining to use the received calculated data model when the evaluation determines that the received calculated data model correlates to the at least one correlation parameter.

7. The method of claim 1, further comprising:
requesting a second data model from the identification of data models when the evaluation determines that the received calculated data model does not correlate to the at least one correlation parameter.

8. The method of claim 1, further comprising:
transmitting to the radio access network node a criteria for receiving updates to the received calculated data model, wherein the criteria comprises at least one of a time period and a defined performance target.

9. A method performed by a network node in a radio access network, the method comprising:
transmitting to a first network node an identification of data models supported by the network node for managing radio communications between network nodes, wherein each of the identified data models comprises a data model for calculating a compact representation of data collected from the radio access network, at least one correlation parameter that can be generated that identifies a relationship among the data of the compact representation for the identified data model, and a metric identifying accuracy of the compact representation of the data collected compared to the data collected;

receiving a request from the first network node that identifies one of the data models with a request that the network node calculate the identified one of the data models;

calculating the identified one of the data models based on the data collected; and transmitting the calculated data model to the first network node.

10. The method of claim 9, wherein the receiving the request from the first network node is received from the first network node on behalf of a second network node; and wherein the transmitting the calculated data model to the first network node is transmitted to the first network node for transmission to the second network node.

11. The method of claim 9, wherein the first network node is a radio access network node, a core network node, or a user equipment.

12. The method of claim 10, wherein the second network node is a radio access network node, a core network node, or a user equipment.

13. The method of claim 9, wherein the identification of data models further comprises an identity of a subset of the data collected from the radio access network and a quality metric for the subset of the data.

14. The method of claim 9, wherein the identification of data models supported by the network node is automatically updated to the first network node triggered by receipt of messages based on new capabilities of the network node.

15. The method of claim 9, further comprising:
receiving a request from the first network node requesting a second data model from the identification of data models.

16. The method of claim 9, further comprising:
updating the calculated data model based on determining that the calculated data model is out of date.

17. The method of claim 16, further comprising:
transmitting the updated data model to the first network node according to criteria received from the first network node for receiving updates to the calculated data model, wherein the criteria comprises at least one of a time period and a defined performance target.

18. A first network node configured to operate in a radio access network, the first network node comprising:
at least one processor; and
at least one memory coupled to the at least one processor, wherein the at least one memory stores instructions that when executed by the at least one processor causes the first network node to perform operations comprising:
receiving from a radio access network node an identification of data models supported by a second network node for managing radio communications between network nodes, wherein each of the identified data models comprises a data model for calculating a compact representation of data collected from the radio access network, at least one correlation parameter that can be generated that identifies a relationship among data of the compact representation for the identified data model, and an accuracy metric identifying accuracy of the compact representation of the data collected data compared to the data collected;

transmitting a request to the radio access network node that identifies one of the data models with a request that the second network node calculate the identified one of the data models based on the data collected;

receiving from the radio access network node the calculated data model from the second network node;

evaluating the received calculated data model based on determining whether the received calculated data model correlates to the at least one correlation parameter.

19. A network node configured to operate in a radio access network, the network node:
at least one processor; and
at least one memory coupled to the at least one processor, wherein the at least one memory stores instructions that when executed by the at least one processor causes the second network node to perform operations comprising:

transmitting to a first network node an identification of data models supported by the network node for managing radio communications between network nodes, wherein each of the identified data models comprises a data model for calculating a compact representation of data collected from the radio access network, at least one correlation parameter that can be generated that identifies a relationship among data of the compact representation for the identified data model, and a metric identifying accuracy of the compact representation of the data collected compared to the data collected;

receiving a request from the first network node that identifies one of the data models with a request that the network node calculate the identified one of the data models;

calculating the identified one of the data models based on the data collected; and transmitting the calculated data model to the first radio access network node.

* * * * *